US007007357B2

(12) United States Patent
Nakamoto

(10) Patent No.: US 7,007,357 B2
(45) Date of Patent: Mar. 7, 2006

(54) REMOVAL AND INSTALLATION DEVICE FOR EXTERNAL AND INTERNAL SNAP RINGS

(75) Inventor: Takayuki Nakamoto, Tokyo (JP)

(73) Assignee: Iwata Denko Co., Ltd., Tokyo (JP)

( * ) Notice: Subject to any disclaimer, the term of this patent is extended or adjusted under 35 U.S.C. 154(b) by 143 days.

(21) Appl. No.: 10/479,482

(22) PCT Filed: Jun. 7, 2001

(86) PCT No.: PCT/JP01/04807

§ 371 (c)(1),
(2), (4) Date: Dec. 1, 2003

(87) PCT Pub. No.: WO02/100602

PCT Pub. Date: Dec. 19, 2002

(65) Prior Publication Data

US 2004/0148746 A1 Aug. 5, 2004

(51) Int. Cl.
*B23P 19/04* (2006.01)

(52) U.S. Cl. ........................... 29/229; 81/302; 81/485; 81/486

(58) Field of Classification Search .................. 81/302, 81/300, 385, 485, 486, 416, 186; 29/229, 29/225

See application file for complete search history.

(56) References Cited

U.S. PATENT DOCUMENTS 5,542,167 A 8/1996 Nakamoto

FOREIGN PATENT DOCUMENTS

| | | |
|---|---|---|
| DE | 19725597 A1 | 10/1998 |
| JP | 08-112778 | 5/1996 |
| JP | 10-000574 | 1/1998 |
| JP | 10-264051 | 10/1998 |

*Primary Examiner*—Robert C. Watson
(74) *Attorney, Agent, or Firm*—Withrow & Terranova, PLLC

(57) ABSTRACT

A removal and installation device for external and internal snap rings that can switch between shaft and hole modes by simple operation and produces better controllability, workability, serviceability and easiness in handling is provided. A rotary plate is rotated in a positive direction, a left side lever is turned as a shaft part is rotated integrally with the rotary plate, right and left side levers are crossed substantially in an X shape, the crossed parts supported by the shaft part, realizing the hole mode. The rotary plate is rotated in reverse direction, the left side lever is turned in a reverse direction as the shaft part is rotated in a reverse direction integrally with the rotary plate, both pivot parts of the right and left side levers arranged substantially in a V shape supported by the shaft part so that both projected working tools are parallel, realizing the shaft mode.

14 Claims, 13 Drawing Sheets

REMOVAL AND INSTALLATION DEVICE FOR EXTERNAL AND INTERNAL SNAP RINGS

This application is a National Phase filing based on International Application No. PCT/JP01/04807, filed Jun. 7, 2001, currently pending.

FIELD OF THE INVENTION

The present invention relates to a removal and installation device used when an external snap ring installed or removed in/from a shaft key groove and an internal snap ring installed or removed in/from a hole key groove are installed or removed, and in detail relates to a removal and installation device which can be switched to a shaft mode or a hole mode.

BACKGROUND OF THE INVENTION

Heretofore, for this type of removal and installation device, there are the one for a shaft mode which can install or remove an external snap ring in/from a key groove on a shaft with separated both ends and the one for a hole mode which can install or remove an internal snap ring in/from a key groove of a hole with both ends brought close and they are dedicated removal and installation devices.

Concretely, in a removal and installation device used when an external snap ring is removed or installed, symmetrical levers continuously formed in a shape except projected working tools on the sides of the ends and gripping levers on the sides of bases support respective curved parts and are coupled to the curved parts so that both projected working tools are parallel, the projected working tools at both ends are bent in a direction in which they are separated, are inserted into holes at both ends of the snap ring when the removal and installation device is used, and when gripping levers are gripped and both ends of the snap ring are widened by both projected working tools, the locking of the holes of the snap ring and the projected working tools is kept and the external snap ring can be securely removed or installed from/in a key groove on a shaft.

Besides, in a removal and installation device used when an internal snap ring is removed or installed, a pair of right and left side levers provided with projected working tools on the sides of the ends and gripping levers on the sides of bases are crossed in an X shape, the crossed parts are supported, the projected working tools at both ends are curved in directions in which they approach, are inserted into holes at both ends of the snap ring when the removal and installation device is used, when the gripping levers are gripped and both ends of the snap ring are brought close by both projected working tools, the locking of the holes of the snap ring and the projected working tools is kept and the internal snap ring can be securely removed or installed from/in a key groove of a hole.

However, these removal and installation devices have a problem that they cannot be used for both the external snap ring and the internal snap ring.

To solve such a problem, these applicants proposed a removal and installation device in which switching to an external snap ring and an internal snap ring was enabled by one operation (refer to Japanese published unexamined patent application No. Hei10-264051).

The removal and installation device is configured so that right and left rotary shafts and a movable pin are interlocked by turning right and left beaks, projected working tools can be set to a hole mode when they are directed inside and in the meantime, when the projected working tools are directed outside, they can be set to a shaft mode.

Though remarkable effect that the removal and installation device in the above-mentioned proposition by these applicants can be switched and set to a hole mode in which the internal snap ring can be removed or installed or a shaft mode in which the external snap ring can be removed or installed is produced, work for turning the right and left beaks is required, a mechanism for interlocking the right and left rotary shafts and the movable pin by turning the right and left beaks is required to be provided in an operating lever provided at the end of a gripping lever and the removal and installation device has a problem that the structure is complex.

The invention is made in view of the above-mentioned conventional situation and the object is to provide a new removal and installation device for external and internal snap rings based upon a removal and installation device that can be switched to a shaft mode in which right and left projected working tools are operated in directions where they are separated when right and left gripping levers are gripped or a hole mode in which contrary to this, both projected working tools are operated in directions where they approach and characterized in that no troublesome work such as turning right and left beaks is required, the new removal and installation device can be switched to the shaft mode or the hole mode by extremely simple operation and more excellent effect is produced in controllability, workability, serviceability and easiness in handling.

SUMMARY OF THE INVENTION

To achieve the object, as disclosed in claim 1, the invention is based upon a removal and installation device for external and internal snap rings which is provided with a pair of right and left side levers having operating levers on the sides of the ends, gripping levers on the sides of bases and pivot parts in intermediate parts, a pair of right and left beaks installed on the sides of the ends of the operating levers of the right and left side levers so that the beaks can be removed and having projected working tools at the ends, a switching mechanism for supporting the pivot parts of the right and left side levers with the pivot parts overlapped and switching the supported positions of both pivot parts to a position for a shaft mode and a position for a hole mode and a spring for pressing the sides of the bases of the right and left gripping levers in an open state, and which can be switched to the shaft mode where the right and left projected working tools are operated in the directions of separation when the right and left gripping levers are gripped or the hole mode where contrary to this, both projected working tools are operated in the directions of approach by operating the switching mechanism, and is characterized in that the switching mechanism is provided with a rotary plate in one pivot part so that the rotary plate can be eccentrically rotated and a circular hole fitted to a shaft part protruded from the rotary plate and integrally eccentrically rotated with the rotary plate so that the shaft part can be rotated in the other pivot part and the switching mechanism is displaced between a position in which the other side lever 3 is turned as the shaft part is eccentrically rotated integrally with the rotary plate, both pivot parts of the right and left side levers arranged substantially in a V shape are supported by the shaft part so that both projected working tools are parallel and the shaft mode is realized and a position in which the right and left side levers are crossed substantially in an X shape, the crossed parts are supported by the shaft part 13 and the hole mode is realized.

In such configuration, when the rotary plate is rotated in a positive direction, the switching mechanism is set in a position in which the other side lever is turned as the shaft part is eccentrically rotated integrally with the rotary plate, the right and left side levers are crossed substantially in the X shape, the crossed parts are supported by the shaft part and the hole mode is realized. Besides, when the rotary plate is rotated in a reverse direction, the switching mechanism is set in a position in which the other side lever is turned as the shaft part is eccentrically rotated integrally with the rotary plate, both pivot parts of the right and left side levers arranged substantially in the V shape are supported by the shaft part so that both projected working tools is parallel and the shaft mode is realized.

Therefore, the removal and installation device according to claim 1 can be switched to the shaft mode and the hole mode by only one operation of rotating the rotary plate in a positive or reverse direction.

Besides, as disclosed in claim 2, the invention is characterized in that a stopper mechanism for releasably regulating the respective rotation of the rotary plate when the shaft part is located in a position for the shaft mode and when the shaft part is located in a position for the hole mode is provided to the switching mechanism is provided to the switching mechanism according to claim 1.

In such configuration, a set state in the shaft mode or the hole mode is locked by the stopper mechanism and if the locked state is released and the rotary plate is rotated in a positive or reverse direction, the switching mechanism can be switched to the shaft mode and the hole mode.

For the concrete configuration of the stopper mechanism, as disclosed in claim 3, a key is arranged in a key groove formed from the outer edge of a rotary plate to the outer edge of a shaft part so that the key can be slid, recesses into which a projection provided at the internal end of the key is locked for regulating the rotation of the rotary plate are provided on the inner face of the circular hole, the recesses are provided in two locations so that each concave portion is locked about the projection when the shaft part is located in the position for the shaft mode and when the shaft part is located in the position for the hole mode and a spring for pressing the key in a direction in which the projection is locked in the locking concave portion is provided in the key groove.

In such configuration, the key is pressed by the spring, the projection is locked in the locking concave portion and a set state of the shaft mode or the hole mode is locked. When the key is slid in a direction in which the locking of the projection and the locking concave portion is released against the pressure of the spring from this state, the locking of the set state is released and further, when the rotary plate is rotated in a positive or reverse direction, the shaft mode or the hole mode can be switched to a reverse mode.

Besides, the invention according to claim 4 is based upon the removal and installation device according to any of claims 1 to 3 and is characterized in that right and left projected working tools are somewhat curved from each axis, both projected working tools are curved outside in the shaft mode and are curved inside in the hole mode.

In such configuration, as the right and left projected working tools are automatically located in a position in which they are curved outside in the shaft mode and are curved inside in the hole mode if the rotary plate is rotated in a positive or reverse direction and is switched to the shaft mode or the hole mode, external and internal snap rings are more securely held in the respective modes.

Besides, for the above-mentioned beak, as disclosed in claim 5, beaks the right and left projected working tools of which are somewhat curved from each axis are prepared and beaks the right and left projected working tools of which are bent downward from each axis, and it is desirable that either pair of the beaks is selected and is installed on the sides of the ends of operating levers so that they can be removed.

Besides, the invention according to claim 6 is based upon the removal and installation device for external and internal snap rings according to any of claims 1 to 5 and is characterized in that an adjusting mechanism that can set a dimension between both projected working tools separated or brought close when right and left gripping levers are gripped to an arbitrary dimension is provided.

In such configuration, by the adjusting mechanism, in the shaft mode, a dimension between the right and left projected working tools separated when the right and left gripping levers are gripped can be arbitrarily set and in the hole mode, a dimension between the right and left projected working tools brought close when the right and left gripping levers are gripped can be arbitrarily set.

Therefore, even if excessive force is made when the right and left gripping levers are gripped, an amount in which the right and left projected working tools are operated is automatically regulated in a suitable range according to the type of the external snap ring or the internal snap ring to be removed or installed and the size.

For the concrete configuration of the adjusting mechanism, as disclosed in claim 7, the adjusting mechanism includes a threaded shaft one end of which is fixed to one gripping lever 2*b* and the other end of which is installed in the other gripping lever so that the threaded shaft can be slid and a nut installed on the threaded shaft so that the nut can be spiraled and a dimension between both projected working tools separated or brought close when the right and left gripping levers are gripped is set to an arbitrary dimension by sliding the nut and arbitrarily setting a location in which the nut is touched to the other gripping lever.

The nut may be also formed by a normal nut member fitted to the threaded shaft so that the threaded shaft can be spiraled, however, as described in an embodiment, if the nut has configuration that a part of a peripheral wall is open, the inside diameter is widened by operating knobs and the fitting to the threaded shaft is released, the nut can be promptly slid and work for setting a dimension between both projected working tools separated or brought close when the right and left gripping levers are gripped is facilitated.

BRIEF DESCRIPTION OF THE DRAWING FIGURES

DETAILED DESCRIPTION OF THE PREFERRED EMBODIMENTS

Figure 1:
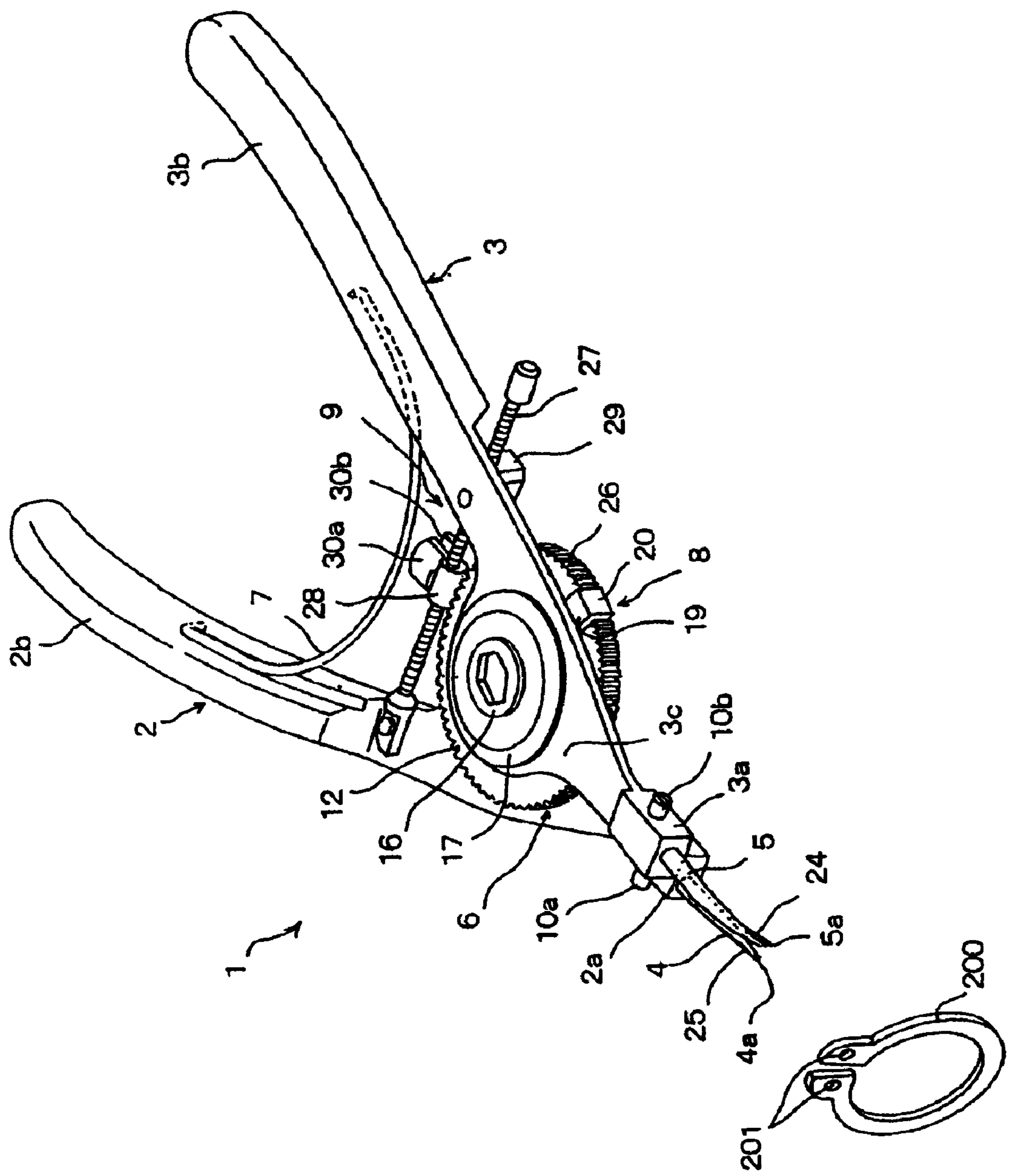
FIG. 1 is a perspective view showing one embodiment of a removal and installation device according to the invention and shows a mode used when an external snap ring is removed or installed.

Referring to the drawings, one embodiment of the invention will be described below.

A removal and installation device 1 equivalent to the embodiment is provided with a pair of right and left side levers 2, 3 having operating levers 2*a,* 3*a* on the sides of the ends, gripping levers 2*b,* 3*b* on the sides of the bases and pivot parts 2*c,* 3*c* in intermediate parts, a pair of right and left beaks 4, 5 installed on the sides of the ends of the operating levers 2*a,* 3*a* of the right side lever 2 and the left side lever 3 so that the beaks can be removed and having projected working tools 4*a,* 5*a* at the ends, a switching mechanism 6 that supports the pivot parts 2*c,* 3*c* of the right and left side levers 2, 3 so that the pivot parts are overlapped and switches the positions of both pivot parts 2*c,* 3*c* to positions in a shaft mode or positions in a hole mode and a spring 7 that presses the sides of the bases of the right and left gripping levers 2*b,* 3*b* in an open state.

The removal and installation device can be switched to the shaft mode (see FIG. 1) that the right and left projected working tools 4*a,* 5*a* are operated in a direction in which they mutually separate when the right and left gripping levers 2*b,* 3*b* are gripped or the hole mode (see FIG. 2) that to the contrary, both projected working tools 4*a,* 5*a* are operated in a direction in which they mutually approach by operating the switching mechanism 6.

The switching mechanism 6 is provided with a stopper mechanism 8 for locking a state in the shaft mode and a state in the hole mode.

The removal and installation device 1 is also provided with an adjusting mechanism 9 between both pivot parts 2*c,* 3*c* and the spring 7 within the right and left gripping levers 2*b,* 3*b,* and a dimension between the right and left projected working tools 4*a,* 5*a* separated or brought close when the right and left gripping levers 2*b,* 3*b* are gripped can be set to each arbitrary dimension.

The adjusting mechanism 9 will be described in detail later. Referring to FIGS. 3 to 7, one example of structure that both projected working tools 4*a,* 5*a* of the right and left beaks 4, 5 and the right and left gripping levers 2*b,* 3*b* can be switched to the hole mode in which an internal snap ring can be installed or removed or the shaft mode in which an external snap ring can be installed or removed by operating the switching mechanism 6 will be described below.

The right side lever 2 and the left side lever 3 are formed by integrating the operating levers 2*a,* 3*a* on the sides of the ends, the gripping levers 2*b,* 3*b* on the sides of the bases and the intermediate pivot parts 2*c,* 3*c,* and the right and left side levers 2, 3 are formed so that they are substantially symmetrical.

The right operating lever 2*a* and the left operating lever 3*a* are located substantially in parallel at the ends of the overlapped pivot parts 2*c,* 3*c,* and the right and left projected working tools 4*a,* 5*a* are inserted into holes provided backward from each surface of the ends of the right and left operating levers 2*a,* 3*a* so that the right and left projected working tools can be extracted. Screws 10*a,* 10*b* for fixing the projected working tools 4*a,* 5*a* inserted into the above-mentioned holes are inserted into tapped holes provided on each side of both operating levers 2*a,* 3*a.*

A rotary plate 12 is installed in the pivot part 2*c* of the right side lever 2 so that the rotary plate can be eccentrically rotated by a pin 11, and a shaft part 13 is formed by a circular convex portion integrated with the center of the rotary plate 12 so that the shaft part 13 is eccentrically rotated integrally with the rotary plate 12.

A circular hole 14 fitted to the shaft part 13 so that the shaft part 13 can be turned is formed in the pivot part 3*c* of the left side lever 3 and a cover plate 17 is fixed on the pivot part 3*c* by a set screw 16 screwed into a tapped hole 15 provided in the center of the shaft part 13. The rotary plate 12 is located between the overlapped pivot parts 2*c,* 3*c* so that the rotary plate can be eccentrically rotated. The rotary plate is also displaced between a position (see FIG. 1) in which the left side lever 3 is turned as the shaft part 13 is eccentrically rotated integrally with the rotary plate 12 and both pivot parts 2*c,* 3*c* of the right and left side levers 2, 3 arranged substantially in a V shape are supported are supported by the shaft part 13 in a state that both projected working tools 4*a,* 5*a* are parallel and the shaft mode is realized and a position (see FIG. 2) in which the right and left side levers 2, 3 are crossed substantially in an X shape, both pivot parts 2*c,* 3*c* which are crossed parts are supported by the shaft part 13 and the hole mode is realized.

Next, to explain the stopper mechanism 8, a key groove 18 is formed from the outer edge of the rotary plate 12 to the outer edge of the shaft part 13 and a key 19 is arranged in the key groove 18 so that the key can be slid. A pressing part 20 protruded outside the rotary plate 12 is formed at the outer end of the key 19 and at the inner end, a projection 21 is formed. On the inside of the circular hole 14 provided to the pivot part 3*c* of the left side lever 3, two recesses 22*a,* 22*b* into which the projection 21 at the inner end of the key 19 is locked for regulating the rotation of the rotary plate 12 are provided.

One locking concave portion 22*a* is provided in a location in which the locking concave portion is locked about the projection 21 when the shaft part 13 is in the shaft mode and the other locking concave portion 22*b* is provided in a location in which the locking concave portion is locked about the projection 21 when the shaft part 13 is in the hole mode. In the key groove 18, a spring 23 for pressing in a direction in which the projection 21 is locked in the locking concave portion 22*a* or 22*b* is provided.

In the shaft mode (shown in FIG. 1) in which both pivot parts 2*c,* 3*c* of the right and left side levers 2, 3 arranged substantially in the V shape are supported by the shaft part 13 in a state that both projected working tools 4*a,* 5*a* are parallel, the key 19 is pressed in a direction of the outer edge of the rotary plate 12 by the pressure of the spring 23, the projection 21 is locked in the locking concave portion 22*a,* the rotation of the rotary plate 12 is regulated and the shaft mode is locked.

Figure 4:
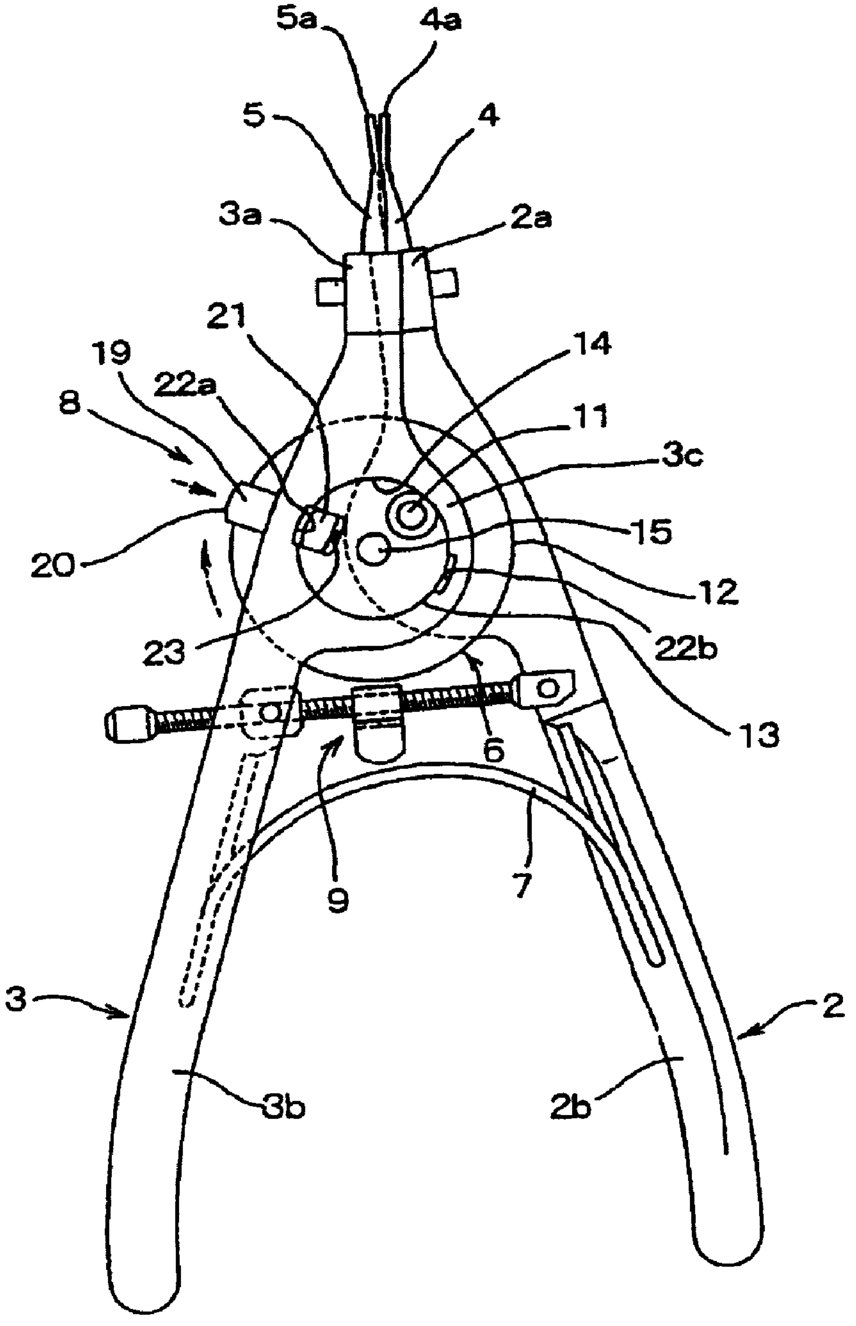
FIG. 4 is a front view for explaining switching operation from the shaft mode to the hole mode.
Figure 5:
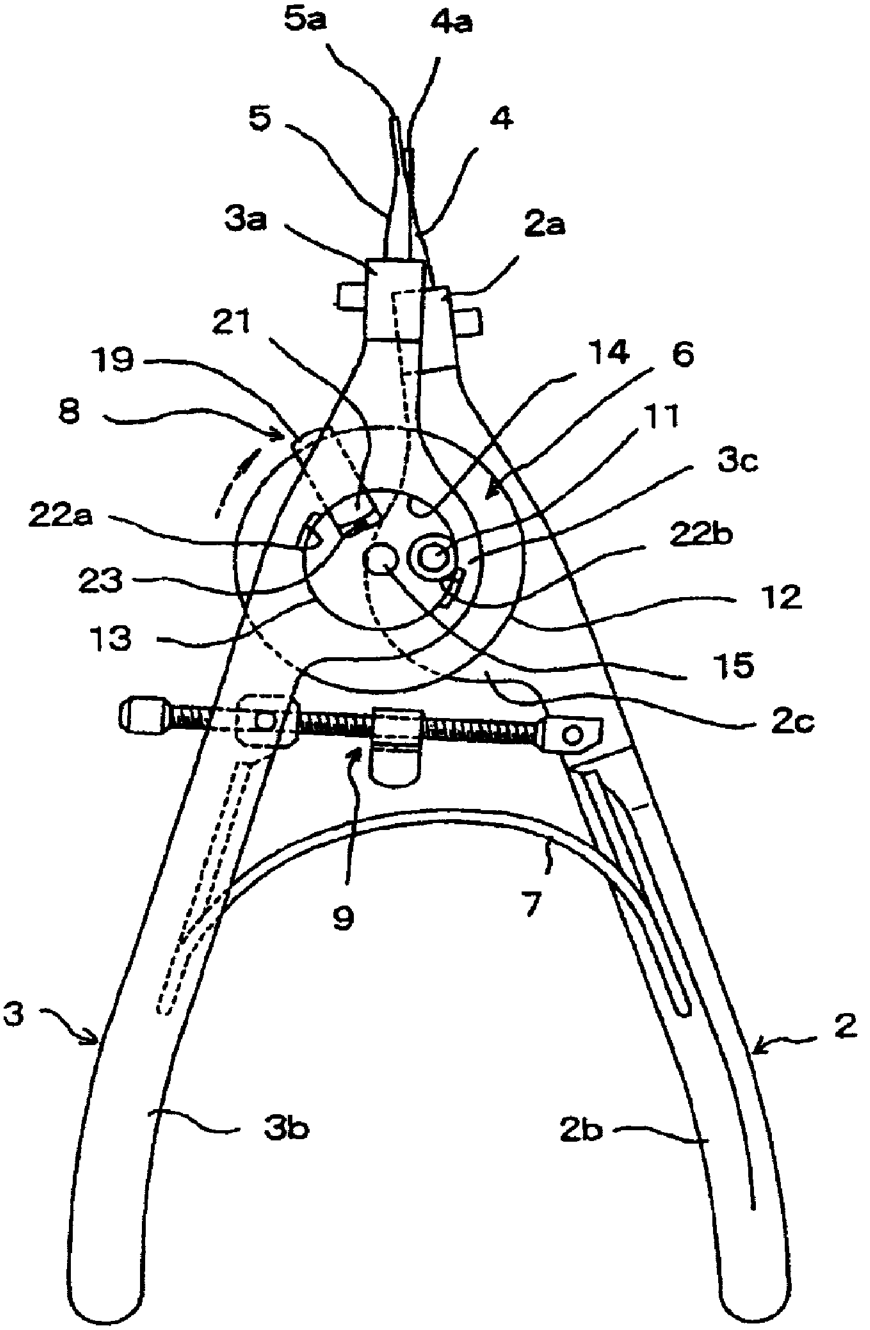
FIG. 5 is a front view for explaining the switching operation from the shaft mode to the hole mode.
Figure 6:
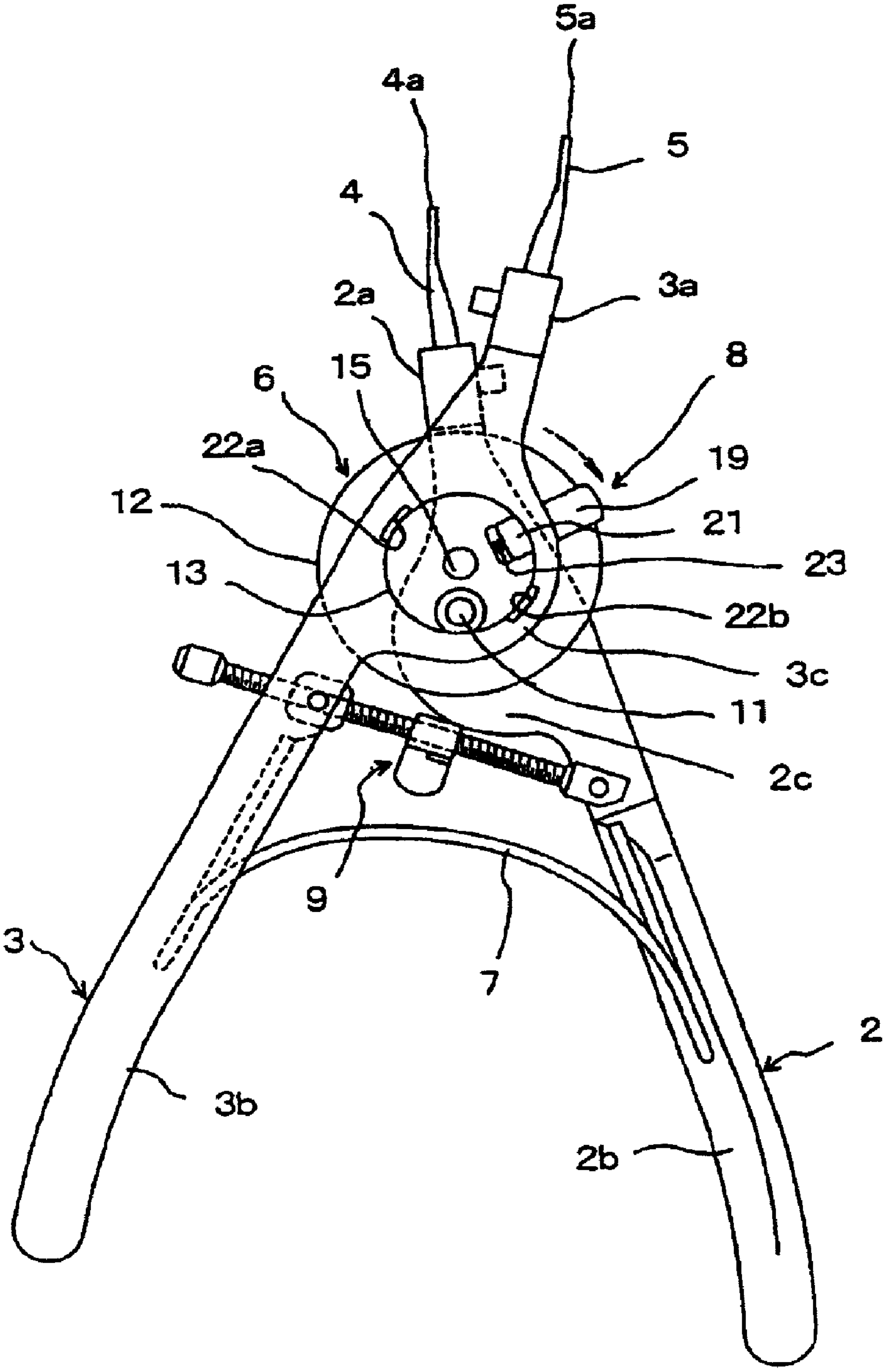
FIG. 6 is a front view for explaining the switching operation from the shaft mode to the hole mode.
Figure 7:
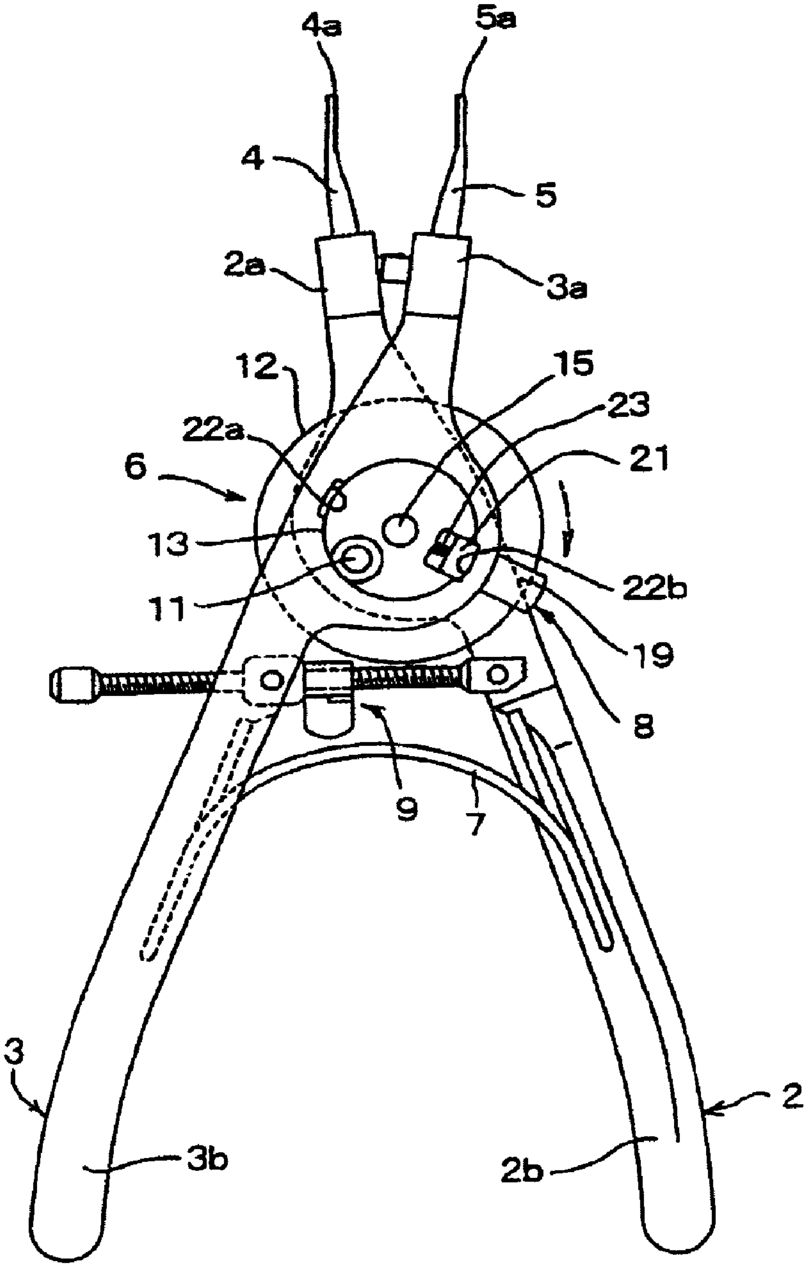
FIG. 7 is a front view showing a state switched to the hole mode.

When the key 19 is pressed in a direction of the center of the rotary plate 12 against the pressure of the spring 23 from this state, the locking of the projection 21 and the locking concave portion 22*a* is released (see FIG. 4). When the rotary plate 12 is rotated in a positive direction in this state, the left side lever 3 is turned with the shaft part 13 as a fulcrum (see FIGS. 5 and 6) as the shaft part 13 is eccentrically rotated integrally with the rotary plate 12 with the pin 11 as a fulcrum, the projection 21 is locked in the locking concave portion 22*b* by the pressure of the spring 23 in a position in the hole mode that the right and left side levers 2, 3 are crossed substantially in the X shape and both pivot parts 2*c*, 3*c* which are the crossed parts are supported by the shaft part 13 and the hole mode is locked (see FIG. 7).

The right and left beaks 4, 5 are respectively integrally formed by metal having predetermined strength such as vanadium steel, are fixed by the screws 10*a*, 10*b* in a state in which the sides of the bases are inserted into holes on each surface of the ends of the right and left operating levers 2*a*, 3*a* and are inserted into the operating levers 2*a*, 3*a* so that the right and left beaks can be replaced.

The projected working tools 4*a*, 5*a* at the ends of the right and left beaks 4, 5 are formed so that they are somewhat curved from the axis, both projected working tools 4*a*, 5*a* of both beaks 4, 5 are curved outside in the shaft mode and are curved inside in the hole mode. The outside orientation or the inside orientation of both projected working tools 4*a*, 5*a* is automatically changed because the positions of the right and left operating levers 2*a*, 3*a* are changed by the turn of the left side lever 3 by the rotation of the rotary plate 12.

In the right and left projected working tools 4*a*, 5*a*, narrow key grooves 24, 25 are formed along the curved inside faces to prevent the projected working tools 4*a*, 5*a* from slipping off the locking hole of the snap ring when the snap ring is installed or removed.

Knurls 26 are formed on the peripheral surface of the rotary plate 12 to prevent slippage and to enable oily fingers to securely rotate the rotary plate 12.

FIG. 1 shows a state in which the removal and installation device 1 is set to the shaft mode and both projected working tools 4*a*, 5*a* of the right beak 4 and the left beak 5 are mutually directed outside. Both pivot parts 2*c*, 3*c* of the right and left side levers 2, 3 arranged substantially in the V shape are supported by the shaft part 13 so that both projected working tools 4*a*, 5*a* are parallel. Hereby, the right and left gripping levers 2*b*, 3*b* are gripped, both projected working tools 4*a*, 5*a* are inserted into holes 201 of an external snap ring 200, both ends of the snap ring are separated and the snap ring can be removed from a key groove of the shaft.

Figure 2:
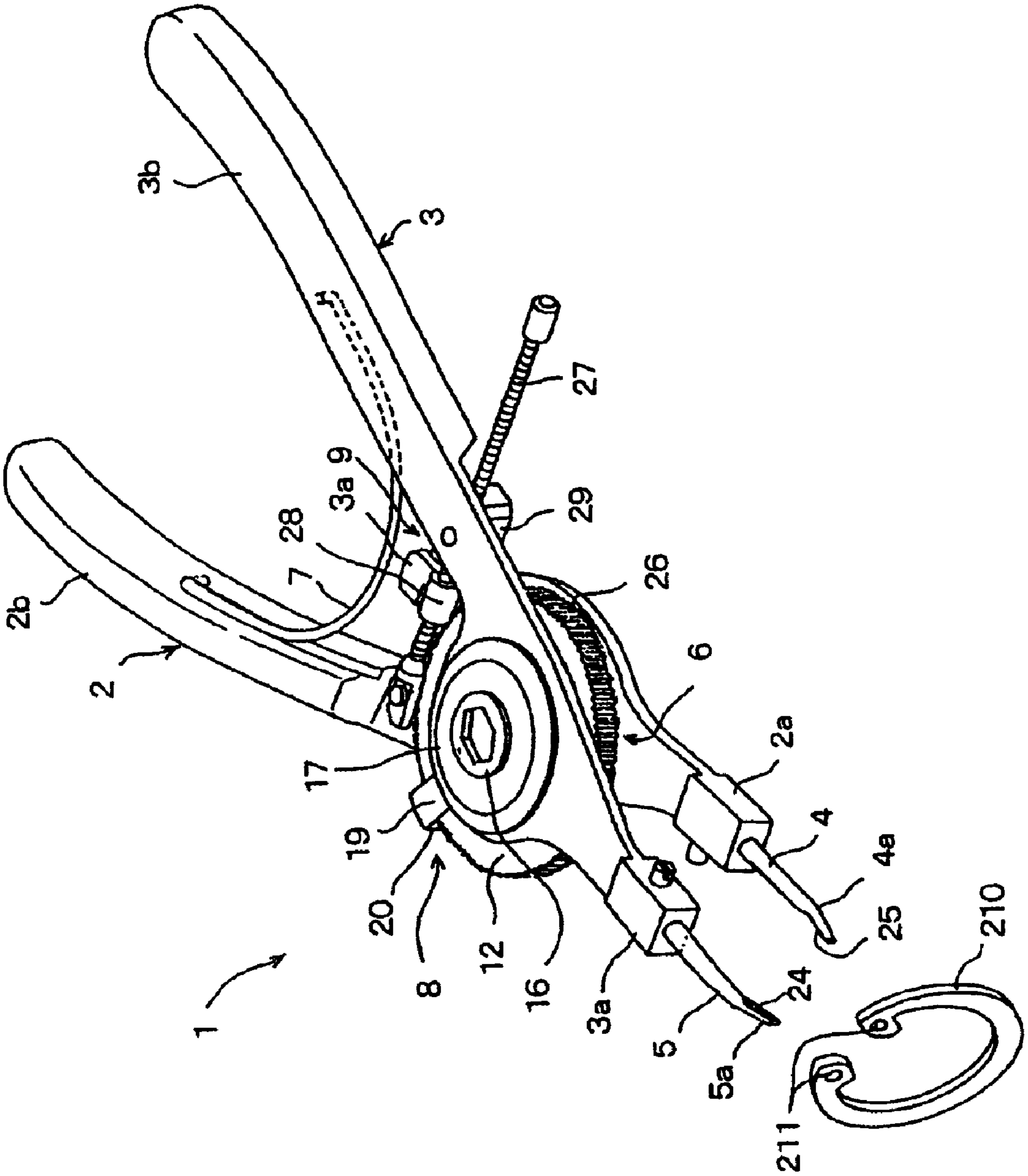
FIG. 2 shows a mode used when an internal snap ring is removed or installed of the removal and installation device shown in FIG. 1.
Figure 3:
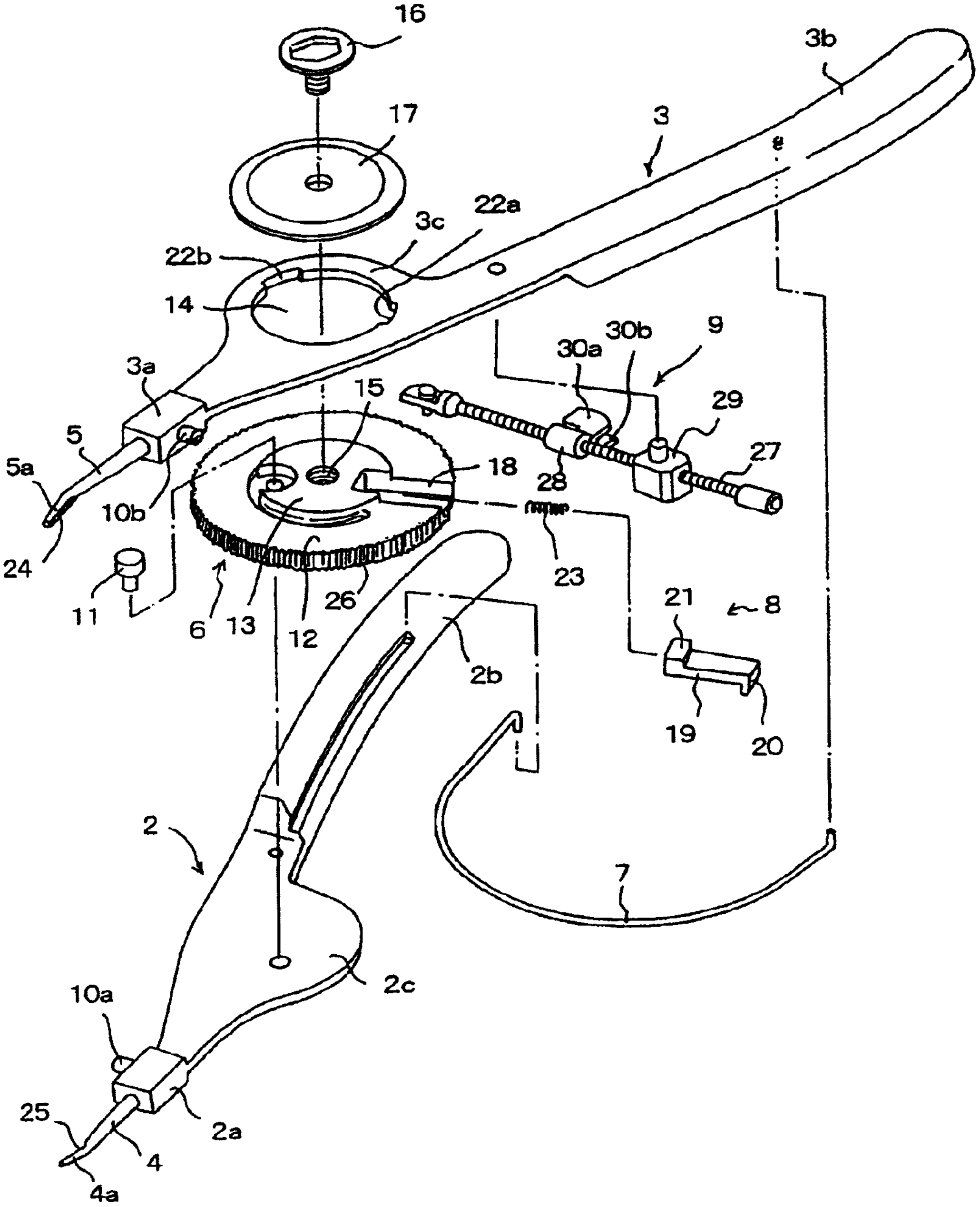
FIG. 3 is an exploded perspective view showing the removal and installation device shown in FIG. 1.

FIG. 2 shows a state in which the removal and installation device 1 is set to the hole mode and both projected working tools 4*a*, 5*a* of the right beak 4 and the left beak 5 are mutually directed inside. The right and left side levers 2, 3 are crossed substantially in the X shape and both pivot parts 2*c*, 3*c* which are the crossed parts are supported by the shaft part 13. Hereby, the right and left gripping levers 2*b*, 3*b* are gripped, both projected working tools 4*a*, 5*a* are inserted into holes 211 of an internal snap ring 210, both ends of the snap ring are brought close and the snap ring can be installed in a key groove in a hole of an object.

FIGS. 4 to 7 show a state in which the removal and installation device 1 is switched from the shaft mode to the hole mode, when the key 19 is pressed in a state in which the shaft mode is locked, the locking is released (FIG. 4) and when the rotary plate 12 is rotated in the positive direction, pressing the key 19, the left side lever 3 is turned by the eccentric rotation of the shaft part 13 (FIGS. 5 and 6), the projection 21 is locked in the locking concave portion 22*b* in the position in the hole mode (FIG. 7) and the hole mode is locked.

The adjusting mechanism 9 will be described below. The adjusting mechanism 9 shown in the drawings includes a threaded shaft 27 and a nut 28.

The threaded shaft 27 is supported so that the threaded shaft can be slid by a supporting member 29 one end of which is fixed to the back (that is, the face on the side opposite to the left gripping lever 3*b*) in a location close to the pivot part 2*c* on the side of the end of the right gripping lever 2*b* so that the threaded shaft can be turned and the other end of which is fixed to the back (that is, the face on the side opposite to the right gripping lever 2*b*) in a location close to the pivot part 3*c* on the side of the end of the left gripping lever 3*b* so that the threaded shaft can be turned.

The nut 28 is formed by a nut member which is fitted to the threaded shaft 27 and which can spiral between the sides of the ends of the right and left gripping levers 2*b*, 3*b* and a position of the nut 28 can be set in a suitable location in a direction of the length of the threaded shaft 27.

A closed angle between both gripping levers 2*b*, 3*b* is arbitrarily regulated by touching the nut 28 set to the suitable location to the inner edge of the left gripping lever 3*b* when the right and left gripping levers 2*b*, 3*b* are gripped.

The nut 28 in this embodiment is provided with a threaded portion engaged with the threaded shaft 27 on its inner surface, a part of a peripheral wall is open, the inner diameter of the peripheral wall is widened by taking upper and lower knobs 30*a*, 30*b* provided to the edge of the opening with fingers and engagement with the threaded shaft 27 is released.

The nut 28 can be promptly slid without being spiraled owing to the above-mentioned configuration and the position of the nut 28 can be easily set.

Figure 8:
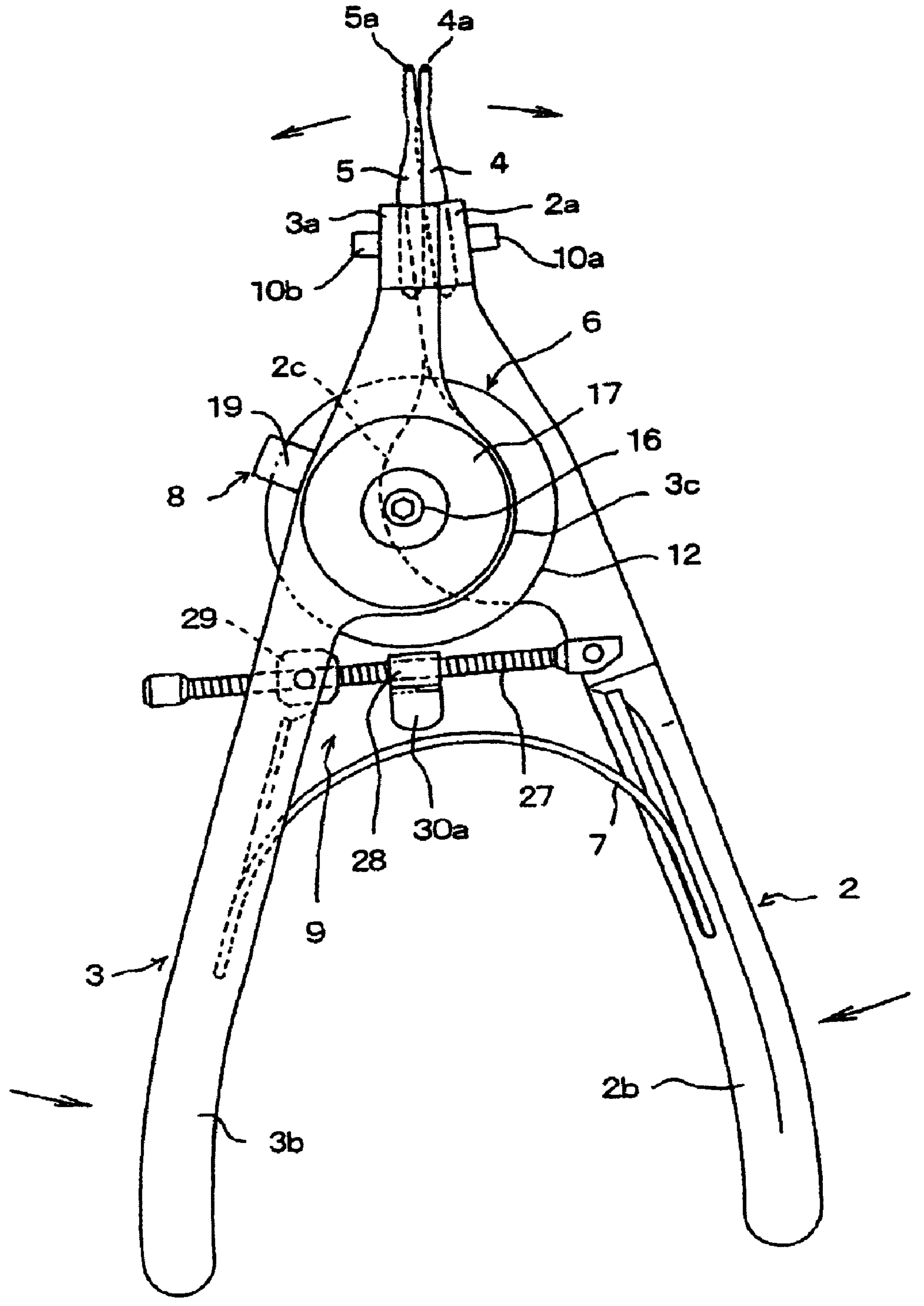
FIG. 8 is a front view showing a used state in the shaft mode.

To explain the adjustment of the closed angle between the right and left gripping levers 2*b*, 3*b* by the adjusting mechanism 9, the removal and installation device 1 shown in FIG. 8 is set to the shaft mode, and both gripping levers 2*b*, 3*b* are open at the maximum by the pressure of the spring 7 at this time, in other words, the right and left projected working tools 4*a*, 5*a* are the closest. The nut 28 is set in a suitable location between both gripping levers 2*b*, 3*b* according to the size of the external snap ring 200 to be removed or installed.

Figure 9:
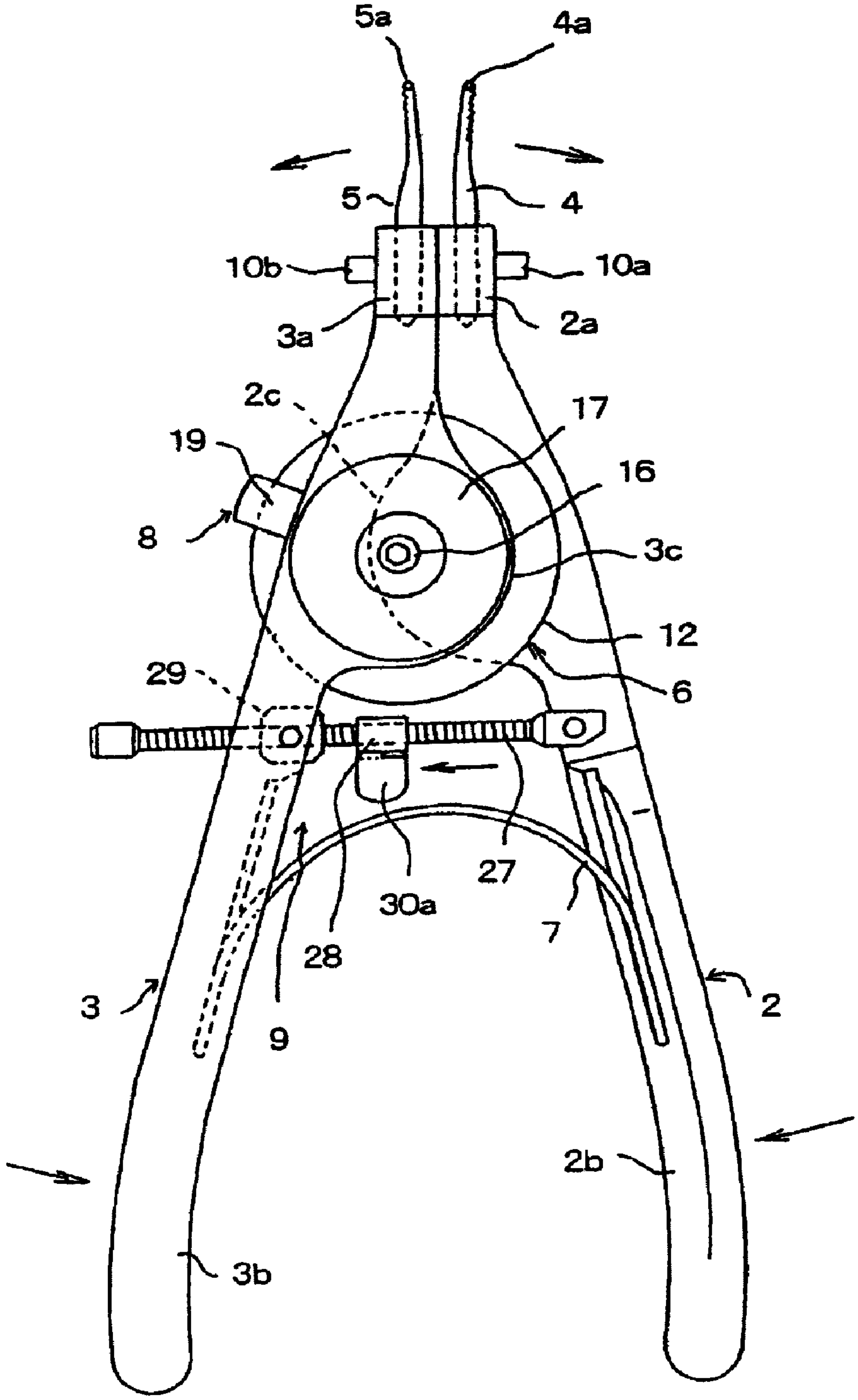
FIG. 9 is a front view showing the used state in the shaft mode.
Figure 10:
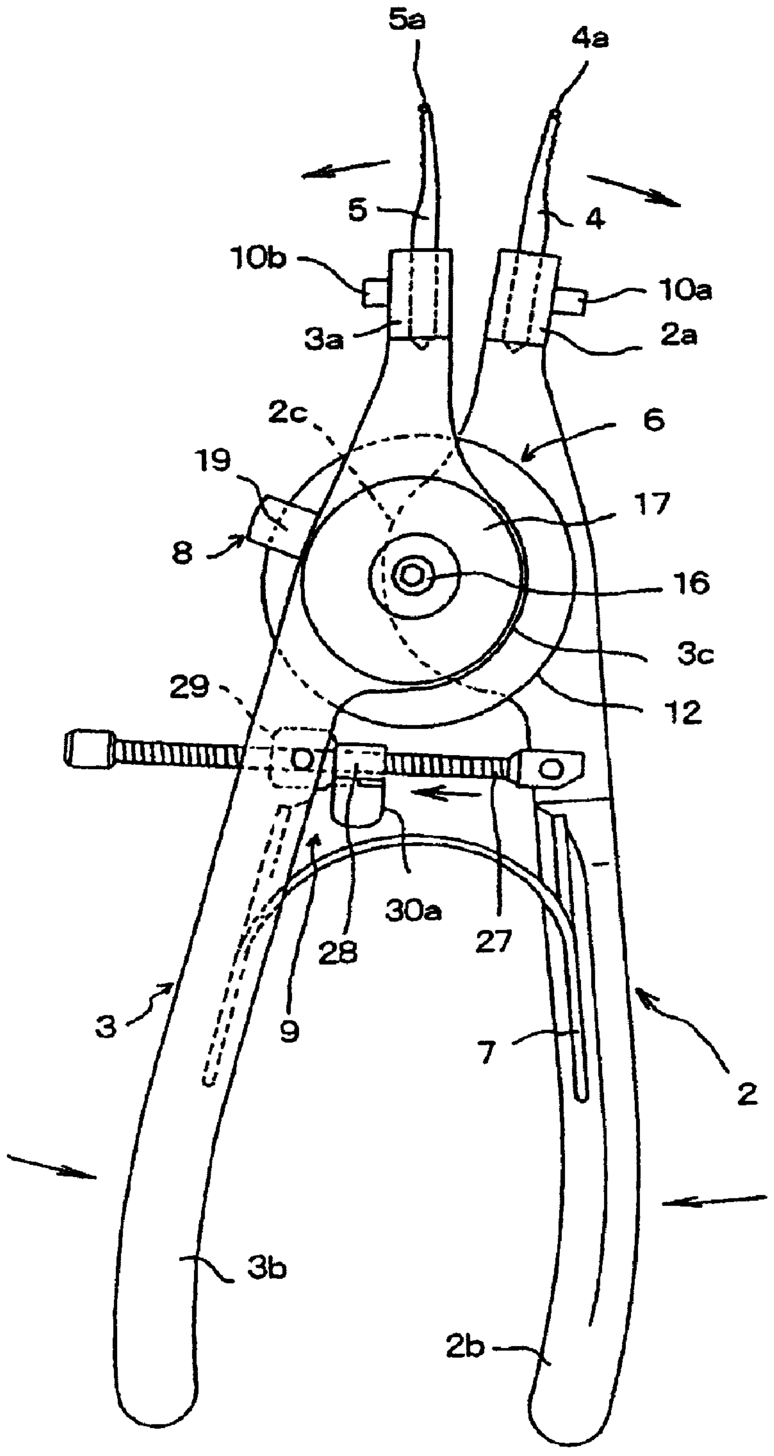
FIG. 10 is a front view showing the used state in the shaft mode.

When both gripping levers 2*b*, 3*b* are gripped (FIG. 9) in this state, the closed angle between both gripping levers 2*b*, 3*b* is regulated in a position in which the nut is touched to the inner edge on the side of the end of the left gripping lever 3*b* and a dimension between the right and left projected working tools 4*a*, 5*a* becomes a suitable dimension corresponding to the size of the external snap ring 200 (FIG. 10).

Therefore, the removal and installation device 1 is operated between a state in which the right and left projected working tools 4*a*, 5*a* are brought close with them apart by a dimension that the projected working tools can be inserted into the holes 201 at both ends of the external snap ring 200 and a state in which the right and left projected working tools 4*a*, 5*a* are separated to a dimension for separating both ends of the snap ring by a suitable amount.

Figure 11:
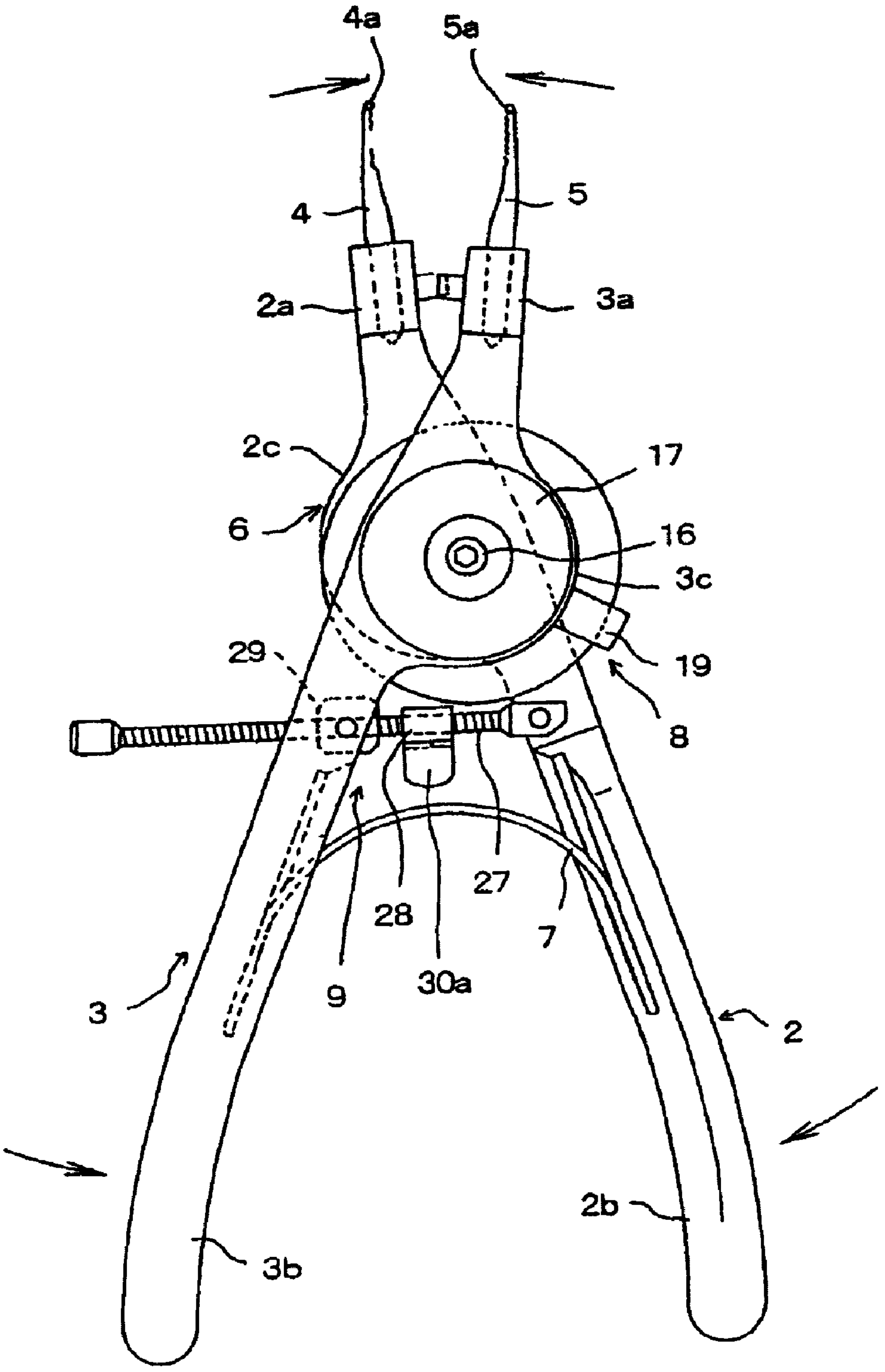
FIG. 11 is a front view showing a used state in the hole mode.

In FIG. 11, the removal and installation device 1 is set to the hole mode and is located in a state in which both gripping levers 2*b*, 3*b* are the farthest by the pressure of the spring 7 at this time, in other words, is in a state in which the right and left projected working tools 4*a*, 5*a* are separated most.

The nut 28 is set to a suitable location between both gripping levers 2*b*, 3*b* according to the size of the internal snap ring 210 to be removed or installed.

Figure 12:
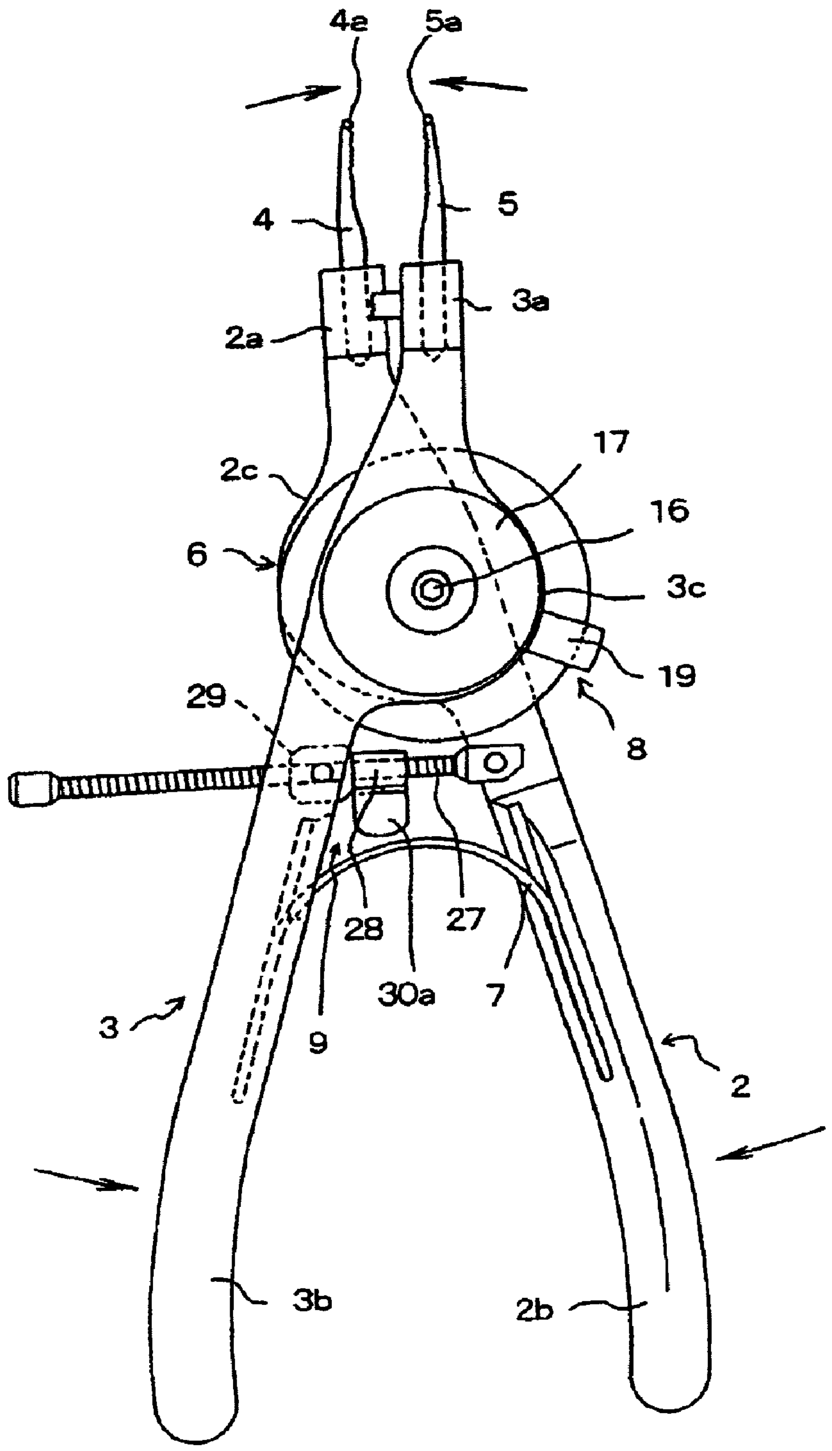
FIG. 12 is a front view showing the used state in the hole mode.

When both gripping levers 2*b*, 3*b* are gripped in this state, the closed angle between both gripping levers 2*b*, 3*b* is regulated in the position in which the nut is touched to the inner edge on the side of the end of the left gripping lever 3*b* and a dimension between the right and left projected working tools 4*a*, 5*a* becomes a suitable dimension corresponding to the size of the internal snap ring 210 (FIG. 12).

Therefore, the removal and installation device 1 is operated between a state in which the right and left projected working tools 4*a*, 5*a* are separated by a dimension that the right and left projected working tools 4*a*, 5*a* can be inserted into the holes 211 at both ends of the internal snap ring 210 and a state in which the projected working tools are brought close to a dimension for bringing both ends of the snap ring close by a suitable amount.

Figure 13:
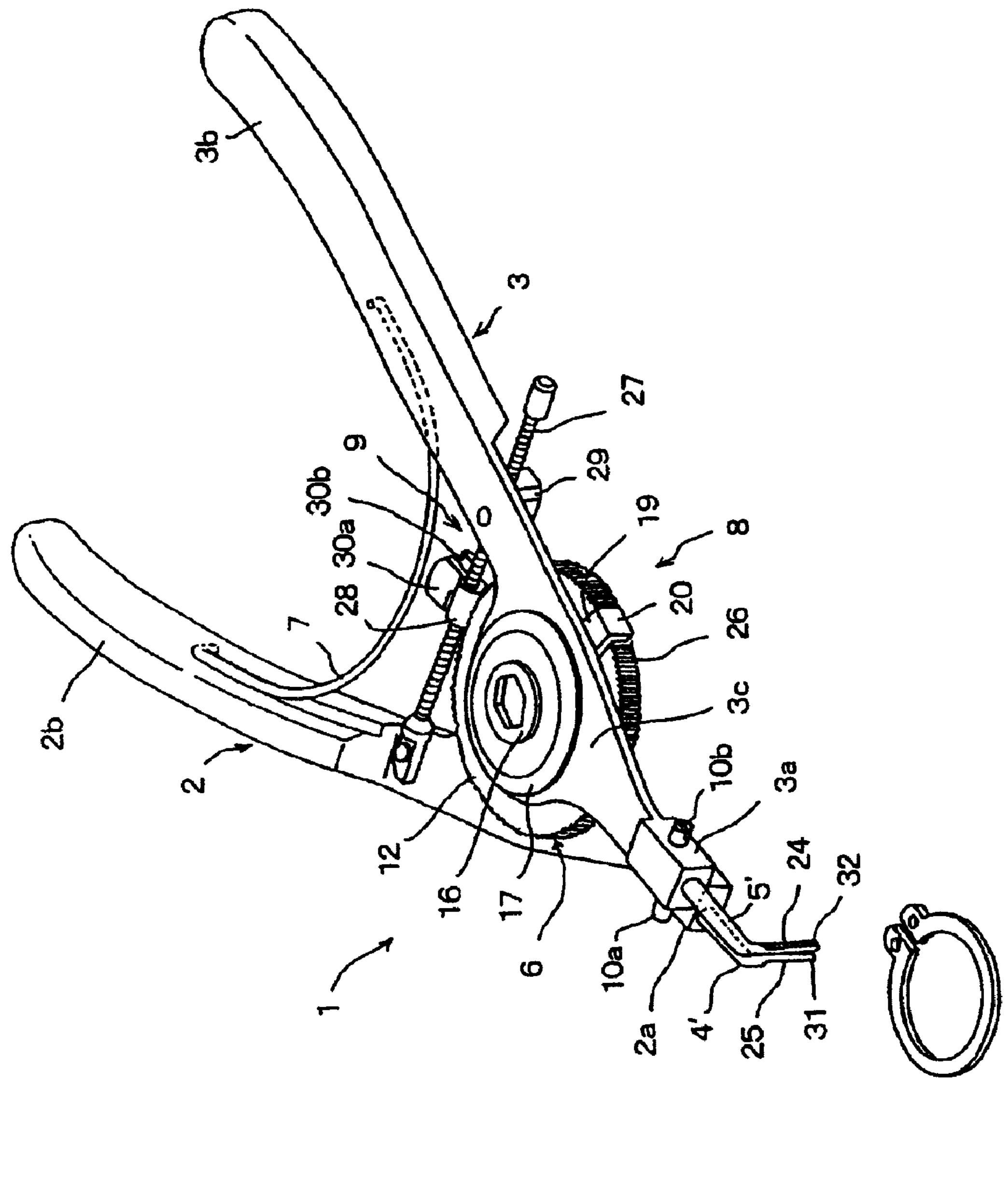
FIG. 13 is a perspective view showing a state in which beaks are replaced in the shaft mode.

Next, a mode shown in FIG. 13 will be described. In FIG. 13, a state in which beaks 4', 5' the right and left projected working tools 31, of which are bent downward from the respective axes are installed in place of the above-mentioned beaks 4, 5 is shown.

The beaks 4, 5 can be easily replaced with the beaks 4', 5' by loosening the screws 10*a*, 10*b* and extracting and inserting them from/into the holes of the operating levers 2*a*, 3*a*. Suitable beaks are selected corresponding to a situation in which each snap ring is removed or installed, the size and material.

Referring to the drawings, one embodiment of the removal and installation device according to the invention for removing and installing the external snap ring and the internal snap ring is described above, however, the invention is not limited to this embodiment and it need scarcely be said that various variations are enabled within technical ideas described in each claim.

INDUSTRIAL AVAILABILITY

As the removal and installation device according to the invention is configured as described above, the following effect is produced.

(Claim 1)

In addition to an advantage that the right and left projected working tools can be switched to the shaft mode in which they are operated in a direction of separation or the hole mode in which contrary to this, they are operated in a direction of approach, the shaft mode or the hole mode can be switched by extremely simple operation of only rotating the rotary plate in a positive or reverse direction without turning the right and left beaks.

Besides, as switching to the shaft mode or the hole mode is enabled by the switching mechanism provided to the pivot parts, the structure is simplified, compared with a type that right and left beaks are turned to switch a mode and remarkable effect in controllability, workability, serviceability, easiness in handling and the reduction of the manufacturing cost is produced by the synergistic effect of these advantages.

(Claim 2)

As the set states of the shaft mode and the hole mode can be locked and switching to the shaft mode or the hole mode is enabled by releasing the locked state, the effect by claim 1 can be made more effective.

(Claim 3)

As the locking of the set state of the shaft mode or the hole mode can be released by extremely simple operation of only sliding the key pressed by the spring and the set state of the shaft mode or the hole mode is automatically locked by sliding the key by the pressure of the spring, the effect by claim 2 can be made more effective.

(Claim 4)

As the right and left projected working tools are curved outside in the shaft mode and are curved inside in the hole mode and a direction of the curve is automatically switched by the turn of the other side lever by the rotation of the rotary plate without turning the beaks, there is effect that the external snap ring and the internal snap ring are more securely held and the workability is further enhanced.

(Claim 5)

There is effect that the mode of the projected working tools can be suitably selected corresponding to a situation in which the snap ring is removed or installed, the size and the material and great demand can be estimated.

(Claim 6)

There is effect that the operation in a suitable range of the right and left projected working tools according to the size of the snap ring is enabled by the operation of the adjusting mechanism, therefore, a degree of force when the right and left gripping levers are gripped is not required to be adjusted according to the size of the snap ring and the snap ring is not extended or is not contracted to a required extent or more.

(Claim 7)

There is effect that the effect acquired in the claim 6 can be realized with relatively simple structure and adjustment by the adjusting mechanism is also realized by simple operation.

What is claimed is:

1. A removal and installation device for external and internal snap ring, comprising:

a pair of levers having pivot portions operating levers and gripping levers, which extend from the pivot portions in directions opposite to one another, a pair of beaks detachably fit to extremities of the operating levers and provided with working tools at their foremost ends, a switching mechanism supporting the pivot portions of the levers in mutually overlying relation to allow any one of the pivot portions to move with respect to the other between a shaft mode position and a hole mode position, and a spring to urge the gripping levers to get spaced away from one another, whereby the switching mechanism provides a shaft mode where the working tools are allowed to move away from one another in opposite directions when the gripping levers are squeezed towards each other and a hole mode where the working tools are allowed to get closer when the gripping portions are squeezed towards each other, and further wherein the switching mechanism includes a rotary plate mounted to any one of the pivot portions for eccentric turning and a shaft part raised integrally above the rotary plate to fit loosely in a circular hole formed in the other of the pivot portions, so that the eccentric turning of the shaft part integral with the rotary plate makes the other pivot portion transfer between the shaft mode position where the levers are supported with the pivot portions in a substantial V-shape merging at the shaft part with the working tools lying in parallel with each other and the hole mode position where the levers are supported in a substantial X-shape crossing at the shaft part.

2. The removal and installation device for external and internal snap ring according to claim 1, wherein the switching mechanism is provided with a stopper to keep the rotary plate against turning movement when the shaft part is at any one of the shaft mode position and the hole mode position.

3. The removal and installation device for external and internal snap ring according to claim 2, wherein the stopper is comprised of a key groove recessed in a way extending radially from a periphery of the rotary plate into a periphery of the shaft part, a key provided at a radially inside end thereof with a projection and fit in the key groove for sliding movement, recesses cut in a circular edge defining the circular hole, and a spring installed in the key groove to urge the projection of the key into engagement with any one of the recesses, whereby the projection is brought into engagement with any of the recesses when the shaft part comes into any of the shaft mode position and the hole mode position.

4. The removal mid installation device for external and internal snap ring according to claim 1 or 2, wherein the working tools are somewhat curved relatively to axes of the beaks in such a direction that the tools are away from one another on shaft mode while toward each other on hole mode.

5. The removal and installation device for external and internal snap ring according to claim 3, wherein the working tools are somewhat curved relatively to axes of the beaks in such a direction that the tools are away from one another on shaft mode while toward each other on hole mode.

6. The removal and installation device for external and internal snap ring according to claims 1 or 2, wherein there are prepared a pair of the beaks having the working tools curved somewhat off the axes of the beaks and another pair of the beaks having the working tools bent downwards, and any of the pairs is selectively used at the extremities of the operating levers.

7. The removal and installation device for external and internal snap ring according to claim 3, wherein there are prepared a pair of the beaks having the working tools curved somewhat off the axes of the beaks and another pair of the beaks having the working tools bent downwards, and any of the pairs is selectively used at the extremities of the operating levers.

8. The removal and installation device for external and internal snap ring according to claim 4, wherein there are prepared a pair of the beaks having the working tools curved somewhat off the axes of the beaks and another pair of the beaks having the working tools bent downwards, and any of the pairs is selectively used at the extremities of the operating levers.

9. The removal and installation device for external and internal snap ring according to claims 1 or 2, wherein there is provided an adjusting mechanism to regulate a closed angle between the gripping levers opposite to each other when manual pressure is applied to the gripping levers to squeeze than towards one another.

10. The removal and installation device for external and internal snap ring according to claim 3, wherein there is provided an adjusting mechanism to regulate a closed angle between the gripping levers opposite to each other when manual pressure is applied to the gripping levers to squeeze them towards one another.

11. The removal and installation device for external and internal snap ring according to claim 4, wherein there is provided an adjusting mechanism to regulate a closed angle between the gripping levers opposite to each other when manual pressure is applied to the gripping levers to squeeze them towards one another.

12. The removal and installation device for external and internal snap ring according to claim 5, wherein there is provided an adjusting mechanism to regulate a closed angle between the gripping levers opposite to each other when manual pressure is applied to the gripping levers to squeeze them towards one another.

13. The removal and installation device for external and internal snap ring according to claim 9, wherein there is provided an adjusting mechanism to regulate a closed angle between the gripping levers opposite to each other when manual pressure is applied to the gripping levers to squeeze them towards one another.

14. The removal and installation device for external and internal snap ring according to claim 9, wherein the adjusting mechanism includes a threaded shaft fixed at one end thereof to any one of gripping levers while installed at another end thereof on the other of gripping levers for sliding movement, and a nut fit around the threaded shaft in thread-engaging manner, so that linear movement of the nut along the threaded shaft to vary a position where the nut makes abutment against the other gripping lever to regulate a closed angle between the gripping levers opposite to each other when manual pressure is applied to the gripping levers to squeeze them towards one another.

* * * * *